Jan. 5, 1960  J. S. ADKINS  2,919,586
GYROSCOPE
Filed Feb. 15, 1954  2 Sheets-Sheet 2
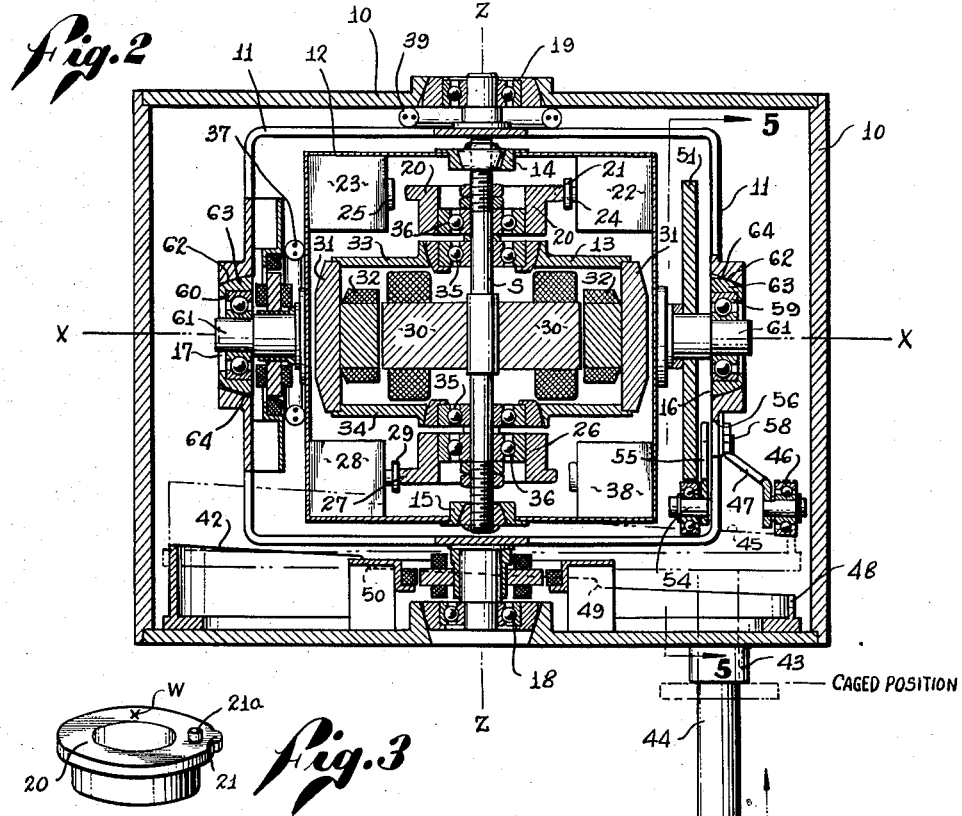
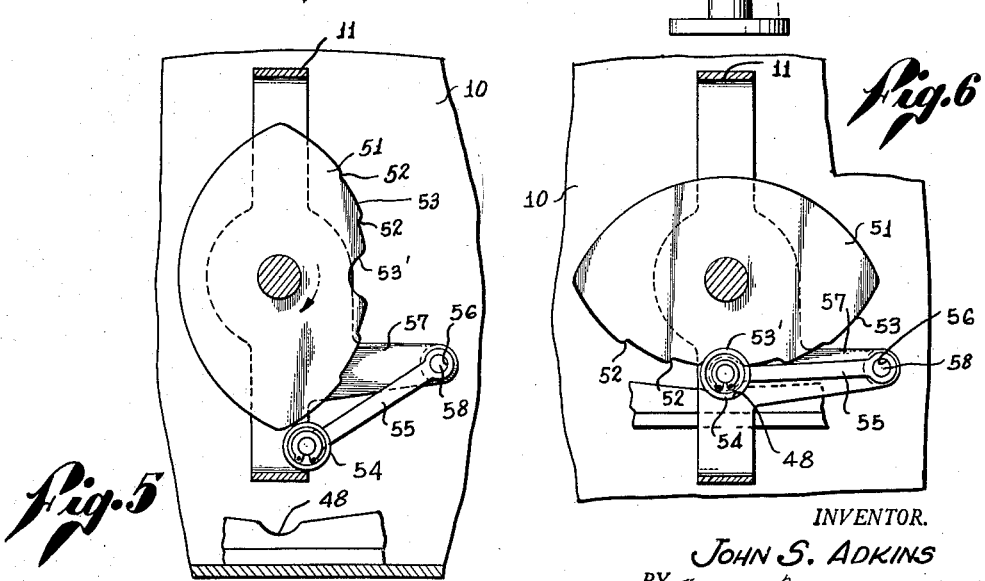
INVENTOR.
JOHN S. ADKINS
BY
Fulwider Mattingly & Babcock
Attorneys United States Patent Office 2,919,586
Patented Jan. 5, 1960

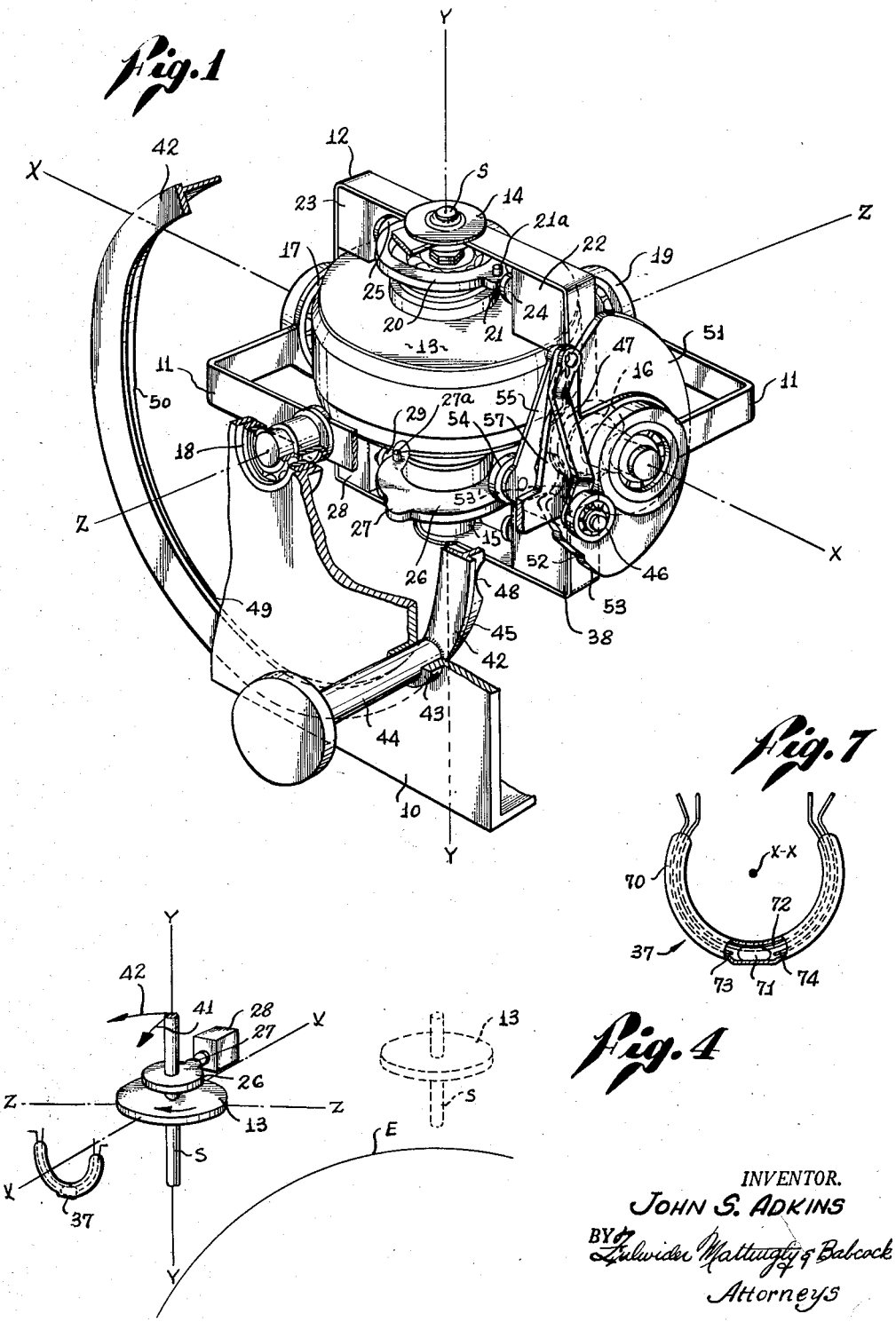

2,919,586

GYROSCOPE

John S. Adkins, Santa Monica, Calif.

Application February 15, 1954, Serial No. 410,237

16 Claims. (Cl. 74—5.44)

This invention relates to gyroscopes and more particularly to balanced vertical flight gyroscopes or gyro vertical for use in aircraft and the like. The invention is especially addressed to a novel erecting mechanism well adapted to vertical gyroscopes, and to a novel caging system and method of assembling, applicable to gyroscopes in general.

In vertical gyros employed in aircraft for indicating at any instant the orientation of the craft as to pitch and roll, there is necessarily incorporated a so-called erecting mechanism. The purpose of the erecting mechanism is to maintain the axis of the gyroscope substantially normal to the earth's surface over prolonged periods of flight. Apparent precession, which causes a deviation from the vertical, is a gradual tilting of the gyro axis from the vertical due to the curvature of the earth. This change from a direction initially normal to the earth's surface to an inclined position is due to the tendency of the gyro axis to remain in a fixed direction in space. Therefore, while the aircraft will follow the earth's curvature, the gyro axis will appear to precess, although in reality its direction is fixed. Friction, erroneous erection signals, and other factors also, at times, cause a deviation of the gyro axis from the vertical. In order then, to have a continually accurate indication of a normal to the earth's surface, some sort of vertical erection mechanism must be employed.

Various types of erecting mechanisms have heretofore been used, and one of the most simple is found in a form of construction wherein the lower portion of the gyroscope is made heavier than the upper portion, thereby providing a construction akin to that of a pendulum, from which the gyroscope is termed a pendulous gyroscope. Many other forms of erecting mechanisms have been used, including those in which servo motors are energized to apply a radially directed force to the spin axis of the gyro. In each case, the radially directed force is applied in a direction perpendicular to that of the desired movement of the spin axis, because of the particular properties of gyroscopes, usually known as precession. Thus, if the spin axis of a vertical gyroscope is subjected to a force acting in a north or south direction, the gyroscope and its spin axis will be found to rotate about a horizontal axis, with the spin axis moving in an east or west direction. Since this mode of operation is characteristic of all gyroscopes having three degrees of freedom, erecting mechanisms for such gyroscopes must operate in this manner.

If the gyroscope is of the balanced type, as opposed to the pendulous type, some means must be provided to compare the actual position of the gyroscope to the vertical. Usually this reference takes the form of a generally pendulous member, and the pendulum must be designed to keep its swinging or vibration from causing corresponding movement of the gyroscope itself. This is particularly true in the case of gyroscopes intended for use in aircraft, where the centrifugal force developed by turns and the movement of the aircraft in general must not be allowed to affect the position of the spin axis of the gyro.

One of the primary objects of the present invention accordingly, is to provide a balanced vertical flight gyroscope incorporating a novel erecting means.

Another object is to provide a novel caging mechanism for a gyroscope of this type, for properly orienting the various gimbal mountings of the gyro preparatory to its being used on a prolonged flight or for adjustment purposes during selected periods of its operation. In this connection, the caging system is designed to be operated by a single control which may be either manually or automatically actuated.

A further object of the invention is to provide a novel method of aligning the various bearings in the gimbal mountings, whereby exact coaxial alignment and parallelism between opposed bearings may be achieved.

Insofar as the erecting mechanism is concerned, the invention contemplates the use of unbalanced disc members disposed coaxially with and on opposite sides of the gyro rotor. These discs are caused to rotate by any suitable means. Because the discs are rotating, their unbalancing effect on the gyro axis will cancel out and not interfere with the gyro during normal operation. Additional means are provided operable in response to a gradual tilting of the rotor axis for stopping one or the other of these discs in a selected position depending upon the direction of tilt. The unbalancing effect will then act on the gyro axis to result in a righting force. The arrangement is such that relatively rapid banks or changes in attitude of the aircraft will have a minimum effect as the erection rate will be kept at a very low value.

Another system which is equally satisfactory is the so-called "Hunting System" in which the unbalanced disc is held on one side or the other to constantly erect the gyro about the vertical axis.

The proper initial orientation of the various gimbal mountings is accomplished by a novel caging system employing a ring type cam member secured to the outer housing and adapted to be urged against a roller element secured to an outer gimbal mounting to cause that gimbal to lie in a predetermined plane. This roller is in turn coupled to another roller adapted to be urged against an elongated cam member secured to the innermost gimbal whereby it will simultaneously be oriented in another predetermined plane.

The method of insuring exact coaxial alignment and parallel spacing of the various ball bearings employed in the rotor and gimbals includes the steps of providing annular inserts having peripheral spherically shaped surface portions adapted to be seated against inner conical surfaces provided in the gimbal frames. The ball bearing races are in turn secured to these inserts and the respective surfaces positioned relative to each other with the aid of a suitable jig until the desired alignment is realized. The inserts are then secured in place either mechanically or by cementing and the aligning jig removed. The engaging spherical and conical surfaces permit the bearing race axis to be oriented in any direction during the adjusting period whereby coaxial alignment and parallelism of the bearing races may be easily effected. Other surfaces capable of being aligned and fixed in position such as a sphere in sphere, knife edges, or other devices may be used without coming outside the scope of this invention, and the method may be used to align the holder for the inner or outer races, or both.

A better understanding of the various features of the present invention will be had by referring to the accompanying drawings in which:

Figure 1 is a schematic perspective view partly broken away to illustrate the relative relationships of the gyro components in accordance with the invention;

Figure 2 is an elevational cross-sectional view of a preferred construction of the gyroscope in which the various gimbal mountings are all co-planar for purposes of illustration;

Figure 3 is a perspective view of the unbalanced cup-like disc employed in the erecting mechanism;

Figure 4 is a schematic force diagram useful in explaining the operation of the erecting mechanism;

Figure 5 is a cross-sectional view as seen along the line 5—5 of Figure 2;

Figure 6 is a view similar to Figure 5 showing the orientation of certain components when the gyroscope is in caged position; and Figure 7 is an elevational view of the form of switch I prefer to use in the operation of my novel erecting system.

Referring now to Figure 1, the basic elements of a gyroscope incorporating the various features of the present invention are shown. This gyroscope is mounted for three degrees of freedom respectively, about three mutually perpendicular axes. These axes are shown in Figure 1 as a horizontal pitch axis X—X, a vertical gyro spin axis Y—Y, and a horizontal roll axis Z—Z. To accomplish the mounting, there is provided an outer fixed support 10 which may be secured to the gyroscope housing, an outer gimbal 11 rotatably mounted on the fixed support, and an inner gimbal 12 rotatably mounted on the outer gimbal and serving to support the gyroscope rotor designated generally by numeral 13.

As shown in Figure 1, the rotor 13 includes a shaft S supported about the vertical or Y—Y axis by means of an upper holder 14 and a lower holder 15 fixed to the inner gimbal frame 12. The inner gimbal frame 12 itself is mounted for rotation about the horizontal pitch axis X—X by means of journal bearings 16 and 17 fixed to the outer gimbal 11. Finally, the outer gimbal frame 11 is mounted for rotation about the horizontal roll axis Z—Z by means of journal bearings 18 and 19 in the outer fixed support 10. With this arrangement, it will be seen that the outer fixed support 10 and housing for the gyroscope may be turned in any manner without changing the direction of the rotor axis which tends to stay fixed in space when the rotor is in motion.

As previously explained, it is necessary to incorporate in a gyroscope mounted in the same manner, some means in the form of an erecting mechanism for maintaining the rotor axis normal to the surface of the earth when the gyro is moved over great distances. This is accomplished in the present invention by applying a small force to the axis of the rotor at right angles to the direction it is desired to move the same to keep it normal to the earth's surface. Due to the properties of the gyroscope such a force at right angles results in a movement of the rotor axis in the desired direction.

In Figure 1 there is shown a preferred type of erecting mechanism for the gyroscope. This mechanism comprises a cup-shaped disc 20 coaxial with the rotor shaft S. This disc is adapted to be rotated and includes at one point on its periphery a small weight serving to unbalance the disc. A projection or stop 21 extends from the edge of the disc, and the weight, such as a slug 21a, may be aligned with the projection or circumferentially displaced therefrom, to be located, for example, at the point W.

Disposed on opposite sides of the disc within the gimbal 12 are solenoids 22 and 23, respectively, arranged to cause their associated plungers 24 and 25 to project towards the disc and engage the projection 21. This action will cause the disc 20 to stop rotating with its projection 21 in line with the horizontal pitch axis X—X, thereby applying a tilting force to the rotor shaft S due to the unbalancing effect of the weight 21a tending to rotate the gyro axis about the horizontal roll Z—Z axis.

A similar cup-shaped unbalanced disc 26 is coaxially disposed below the rotor 13 and is provided with a similar projection 27. A solenoid 28 having a plunger 29 for stopping the projection 27 in a position such that the unbalance weight 27a is in line with the horizontal roll axis Z—Z, and is mounted on the gimbal frame 12 at its lower end as shown. The unbalancing effect of the disc 26 when stop 27 is in line with the Z—Z axis tends to cause the gyro axis to rotate about the X—X axis. A similar solenoid plunger is provided in the diametrically opposite position with respect to disc 26.

In Figure 2 the gyroscope is shown in greater detail, the same reference numerals being employed as in Figure 1 to designate the corresponding components. The positioning of the gimbal mountings as shown in Figure 2 would be their position as seen looking at the gyro in Figure 1 in the direction of the vertical Y—Y axis, the inner gimbal mounting 12 being rotated about the horizontal X—X axis to lie in the X—Z plane.

Referring to Figure 2, a preferred form of construction of the gyroscope is illustrated. As shown, the actual construction of the rotor 13 is that of an inside-out motor. Located around the rotor shaft S are stationary field windings 30 which are connected to a source of electrical power by suitable conductors (not shown) whereby a rapidly rotating magnetic field is established. The rotor 13 is in the form of a cylindrical box structure housing the field windings 30 with the annular cylindrical portion 31 supporting squirrel cage 32 adjacent the stationary field windings 30. As shown, there are provided circular top and bottom plates 33 and 34 closing the ends of the cylindrical portion 31 and supporting the rotor for rotation about shaft S as by ball bearings 35. The interaction between the magnetic fields of the squirrel cage and field windings, respectively, causes rotation of the rotor structure about the shaft S and field windings 30. The unbalanced discs 20 and 26 are shown mounted for free rotation about the shaft S by ball bearings 36.

One means for causing rotation of the cup-shaped discs 20 and 26 about shaft S is to make these unbalanced discs of magnetic material and employ suitable metal parts in the rotor construction, such as the plates 33 and 34 whereby the discs will be dragged round the shaft S with the rotor 13 by drag cup action. Other simple means may be employed such as a frictional drag means, for example.

In order to actuate the solenoid plungers 24 and 25 to stop the disc 20 in a desired position, there is provided a mercury type gravity switch 37 shown in alignment with the horizontal X—X axis in Figure 2 and arranged to close a circuit in the solenoids 22 or 23 through a globule of mercury when tilted in one direction or the other. In the particular construction shown, for example, rotation of inner gimbal 12, and consequently of the mercury switch 37 about the X—X axis will operate the solenoid 22 or the solenoid 23, depending upon whether the tilting is clockwise or counterclockwise, to maintain unbalanced disc 20 in the position to properly erect the gyro.

To operate the lower solenoid 28 and its oppositely disposed solenoid 38, there is provided a further mercury switch 39 shown disposed at right angles to the mercury switch 37, whereby rotation of the outer gimbal 11 about the Z—Z axis will cause operation of either the solenoid 28 or the solenoid 38 to maintain unbalanced disc 26 in the position to properly erect the gyro.

In Figure 7 I have shown a form of switch that I prefer to use to operate the solenoids 22, 23, 28 and 38. As shown in that figure, the switch 37, for example, includes a generally tubular member 70 of insulating material such as glass, formed into an arc of a circle. The center of this circle is concentric with the associated gimbal axis, such as the axis X—X, so that balance and sensitivity problems are minimized. Located within the tubular member 70 is a globule of mercury 71 that is always in electrical contact with a common conductor 72, while the globule may make contact with either of two other conductors 73 and 74, located on opposite sides of the center of the arc of the tubular member 70. Adjacent the center of the arc, the bottom or radially outward portion of the tubular member 70 is somewhat flattened, so that a very slight movement of the tubular member will cause the globule of mercury 71 to move to one side or the other to complete a circuit through conductor 73 or 74 to the corresponding one of the solenoids 22 or 23. In this manner, extreme sensitivity of the switch is secured, while unbalance of the mechanical portions of the gyroscope is kept to a minimum at all times.

Figure 3 shows an enlarged perspective view of the disc 20 clearly showing projection 21 and the positions of unbalance weights 21a and 27a for discs 20 and 26, respectively.

*Operation of the erecting mechanism*

Referring again to Figure 1 and the diagram shown in Figure 4, assume that the gyroscope is mounted in the nose of an aircraft traveling from east to west in the direction of the horizontal Z—Z axis. As shown in Figure 4, when the rotor axis is normal to the surface of the earth E, as shown in phantom lines, the proper vertical normal to the earth's surface will be indicated by the gyro regardless of the motion of the aircraft. However, after the aircraft has traveled over a considerable distance in the direction of the horizontal Z—Z axis, the gyro axis will assume a tilting angle with respect to the surface E as indicated by the solid line representation of the gyroscope. This apparent tilting is due to the fact that the gyro axis tends to remain fixed relative to space.

Since the force of gravity is always in a direction normal to the surface of the earth, the globule of mercury 71 in the gravity switch 37 will close the right hand contacts causing actuation of the solenoid 23 thereby stopping the upper cup-shaped disc 20 with its unbalancing weight 21a in line with the X—X axis. The effect of this unbalanced disc is to exert a tilting force on the gyro axis tending to rotate it about the Z—Z axis as indicated by the arrow 41. Due to the characteristics of the rapidly rotating gyroscope, this force results in a resultant motion acting at right angles on the rotor axis as indicated by tht arrow 42, this force being in a direction to align the rotor axis again in a direction normal to the surface of the earth E.

After the axis has been righted, the mercury globule 71 in the switch 37 will return to its center position thereby opening the right hand contacts and permitting retraction of the plunger 25 in solenoid 23 to permit the cup-shaped unbalanced disc 20 to resume rotation.

When the gyroscope is tipped to a position with one side lower than the other, i.e., rotated about the Z—Z axis, a similar action tending to right the gyroscope axis is effected by the gravity switch 39, solenoids 28 and 38, and the unbalanced cup-shaped disc 26. When the gyroscope is moved to positions intermediate those mentioned, both gravity type switches are free to operate to stop the discs 20 and 26 with their weights 21a and 27a, respectively, at 90° to each other resulting in a net unbalancing force on the gyroscope axis tending to rotate it about a suitable axis intermediate the X—X and Z—Z axes. Thus, it is seen that the switches are akin to a pendulous type control for the erecting mechanism.

It is to be understood, of course, that the gravity type switches 37 and 39 are extremely sensitive to slight variations of the rotor axis from the exact normal. These switches therefore could be easily operated by normal turning of the aircraft or changes in its attitude. Stopping of the unbalanced disc for such a relatively short period of time, however, will not affect appreciably the disposition of the gyro axis. In other words, the erecting mechanism has a relatively long time constant and to be effective it is necessary that the discs be stopped for an appreciable period, far longer than the time taken to execute the usual turns or changes in attitude of the aircraft.

It is possible to operate my improved gyroscope with a "hunting" type of erection system. In such a system the cup 20, for example, instead of continually rotating, is normally held with its weight 21a at one side or the other. This causes an unbalance, which acts to tip the gyro and operate the switch 37. Thus, if solenoid 22 has been energized to hold the disc 20, when the gyro has tipped, solenoid 22 is de-energized. Thereupon, either by a mechanical connection or by electrical means, the plunger 25 of solenoid 23 is extended to engage the projection 21 of the cup, thereby unbalancing the gyro in the opposite direction, and causing it to erect. The process continues all the time the gyro is operating, and consequently the gyro "hunts" back and forth across the true vertical.

*Construction of caging means*

Referring again to Figures 1 and 2, in order to insure that the inner and outer gimbal mountings and the frame 12, 11, and 10 are initially properly caged in mutually perpendicular planes, there is included a novel caging mechanism comprising a ring cam member 42 slidably secured to the frame 10 or housing for the gyro as at 43, and adapted to be moved in the direction of the Z—Z axis by means of a plunger member 44. As shown, the ring cam has a tapering width in the direction of the Z—Z axis, the inner facing surface of the ring 45 being adapted to engage a roller 46 secured to an arm 47 in turn rotatably mounted to the intermediate gimbal frame 11. Roller 46 is adapted to ride on this camming surface 45 of the ring cam when the gimbal frame 11 is rotating about the Z—Z axis, the roller 46 falling into a small groove 48 at the point of minimum width of the ring cam, when the gimbal 11 is perpendicular to the outer frame 10. This roller is effectively prevented from backtracking on the ring cam surface 45 by means of cam steps 49 and 50.

The caging mechanism also includes an elongated elliptically shaped cam 51 secured to the inner gimbal 12 and including steps 52 on its peripheral camming surface 53 adapted to engage a second roller 54 on the end of an arm 55. In properly caged position, roller 54 will seat in the grove 53' in camming surface 53. Arm 55 is coupled to the arm 47 through an opening 56 offset by a projecting portion 57 on gimbal mounting 11 as clearly shown in Figure 5. The two rollers 46 and 54 are thus adapted to move back and forth in small arcuate movements approximately in the direction of the Z—Z axis by swinging about a pivotal mounting 58 in opening 56. The camming surface 53 of the elongated cam 51 is such as to orient the inner gimbal mounting 12 in a plane perpendicular to the planes of gimbal 11 and frame 10. The properly caged position for the gyroscope is as shown in Figure 1. After this orientation has been effected, the plunger 44 may be retracted leaving the gimbals free to rotate.

The arrangement of the ring caging cam member 42 and operating plunger 44 is shown clearly in Figure 2. Front views of the elongated cam member 51 in uncaged and caged position, as seen along the line 5—5 of Figure 2, are shown in Figures 5 and 6, respectively.

*Operation of the caging mechanism*

In the operation of the caging mechanism, as shown in Figure 2, assume that outer gimbal 11 is rotated about the Z—Z axis 180° to bring the roller element 46 into engagement with the camming surface 45 of the ring cam 42. Urging of the ring cam 42 against the roller 46 by means of the plunger 44 will cause the roller to move down the sloping surface 45 past the first step 50. This camming action will continue moving the roller on down the cam past the step 49 to eventually lodge in the groove 48. As already explained, the steps 50 and 49 effectively prevent any backtracking of the roller 46 in the event the gyroscope is subject to sudden motions. As also explained, the caged position of the other gimbal 11 is actually in the Y—Z plane as shown in Figure 1.

Simultaneously with the above described action of the ring cam member, the roller element 54, which is coupled to the roller element 46 through the arm 55, the pivot axis 58, and arm 47, will be urged against the elongated cam 51. This initial engagement is shown in Figure 5. As the plunger 44 is moved inwardly further, the roller 54 will cam the member 51 in a clockwise direction as seen in Figure 5 to the position shown in Figure 6, the roller 54 being seated in the groove 53' as shown. The cam 51 also includes steps 52 effectively preventing any backtracking of the roller 54. This action will swing the inner gimbal mounting 12 about the horizontal X—X axis to bring the rotor axis into alignment with the vertical or Y—Y axis.

It is thus seen that by a simple manual movement of the plunger 44, the gimbal mountings may be properly caged in mutually perpendicular planes. The plunger 44 may be either manually operated or automatically operated as desired.

*Bearing alignment*

Referring once again to Figure 2, a feature of the present invention contemplates a novel method for insuring precise coaxial alignment of the various bearings journaling the gimbal and rotor shafts. As an example, the bearings 59 and 60 shown secured to opposite sides of gimbal mounting 11 in Figure 2, must be coaxial with respect to each other and lie in parallel planes in order that the inner gimbal mounting shafts 61 will be supported for minimum bearing friction.

In accordance with the method, the inner annular surfaces 62 of the sockets in the intermediate gimbal mounting 11 are of a conical shape. The bearings 59 and 60 are in turn secured to insert elements 63 each having an annular peripheral surface 64 of the shape of a portion of a sphere, adapted to seat against the conical surface 62. During the initial adjustments, a suitable jig supports the bearings 59 and 60 and attached inserts 63. Because of the conical shape of the surface 62 and the spherical shape of the peripheral surface 64 of the inserts, the axis of each bearing may be properly oriented by a rotating motion applied to the race. This latter motion can be easily accommodated by the engaging surfaces in view of their different curved shapes. It is thus possible to align precisely the two bearings by means of a jig, at which moment the inserts 63 are secured to the gimbal mounting sockets as by cementing, welding, soldering, or by screws, for example. The aligning jig may then be removed and the assembly of the gyroscope completed. The same method may be employed for mouting the rotor 13 on the shaft S and for aligning the bearings in the outer gimbal 10 journalling the inner gimbal 11.

The jig used in aligning the bearings may be very simple and in one form takes the shape of a cylindrical rod upon which the bearings are slid preparatory to mounting in their supports. The rod is, of course, accurately formed to be round, without taper, and straight, and held to these conditions within extremely small tolerances. While such a jig requires precision work, it is comparatively simple to secure such a rod and maintain it within the required tolerances. Previous methods of construction have required the use of precision boring jigs to bore accurately aligned and concentric holes to receive the bearings, and such a jig is both difficult and expensive to fabricate, and easy to get out of adjustment.

The above described method and means insures that bearings are properly aligned upon being placed in the inserts, and this is so whether they are the original bearings or replacement bearings. After aligning and fixing the inserts 63 to the frame, bearings can readily be removed from and inserted therein, with complete assurance that the bearings are properly positioned when so inserted. All that is required to remove a bearing is to tap it and remove it from the insert; a new bearing is easily and quickly installed by tapping it into the insert. The inserts, being properly aligned, initially, maintain their alignment permanently. This arrangement contrasts sharply with prior art bearing alignment means and procedures, which involve securing the outer portion of the bearing to the frame. To replace bearings in such arrangements, the connection between the bearing and frame is broken so that it can be removed. Since new bearings when positioned are not connected to the frame, the entire alignment procedure must be carried out before they can be secured in place.

Alignment of bearings as heretofore practiced involves considerable care, time and expense, and requires the services of a skilled worker. But with the bearing alignment method and means of my invention, bearings can be replaced in a minimum of time by an unskilled mechanic, and with complete assurance that the bearings, upon being inserted in the inserts 63, are completely and accurately aligned.

While the use of mating conical and spherical surfaces has been mentioned, it is apparent that other similarly cooperating surfaces can be used. For example, a spherical surface can be used within another spherical surface, and other combinations can be employed. Similarly, the inner race of a bearing may be aligned with its holder, or both the inner and outer races may be aligned with their respective holders. Further, not only may the confronting surfaces ( of the inserts 63 and the walls of the openings in which they are oriented) be of any desired configuration, my invention also is not limited to the alignment of bearings of a gyroscope. My method and means for bearing alignment is applicable for insuring alignment of bearings for any rotatable device, e.g., motor shafts, etc. Further, the invention is not restricted as to the type of bearing employed; for example, it is readily suited to insure proper automatic alignment of either ball bearings or sleeve bearings.

It will be apparent from the foregoing that there has been provided a greatly improved balanced type gyroscope incorporating a novel erecting means, and in which the caging of the gyro can be easily effected by a single movement of a plunger control. The novel method of bearing alignment results in a tremendous simplification in the manufacture of the gyroscope.

Modifications employing the principles of the present invention will occur to those skilled in the art. While a preferred form has been shown and described, it is to be understood that the invention is not to be restricted to the particular form and arrangement of parts herein described and shown, except as limited by the following claims.

I claim:

1. In an erecting mechanism for a gyroscope including a rotor member and a gimbal rotatably mounting the rotor, the combination comprising: an unbalanced disc element coaxial with said rotor; means for continuously rotating the disc at a relatively low speed; means secured to the gimbal for stopping the rotation of the disc in a selected position, whereby the unbalanced weight of said disc causes the precession of said rotor; and means responsive to a tilting of the rotor axis from a position normal to the earth's surface for actuating said disc stopping means.

2. In a vertical flilight gyroscope including a rotor, an inner gimbal rotably mounting the rotor, an outer gimbal mounting the inner gimbal for rotation about an axis perpendicular to the rotor axis, and a frame mounting the outer gimbal for rotation about an axis perpendicular to the axis of rotation of the inner gimbal, an erecting mechanism for maintaining the rotor axis normal to the surface of the earth comprising: an unbalanced disc member coaxial with said rotor; means for continuously rotating said disc at a relatively low speed; and means secured to said inner gimbal for stopping the rotation of the disc in a selected position in response to a gradual tilting beyond a predetermined amount of the rotor axis away from said normal, whereby a correcting torque acts on the rotor axis due to the unbalanced weight of said unbalanced disc to bring the axis back to its normal position.

3. The subject matter of claim 2, in which said means for stopping the rotation of the disc comprises a solenoid operated stop member having a plunger adapted to engage the edge of said disc and a gravity operated switch for actuating the solenoid.

4. In a gyroscope including a rotor, an inner gimbal rotatably mounting the rotor, an outer gimbal rotatably mounting the inner gimbal, and a frame rotatably mounting the outer gimbal, a caging mechanism for orienting said gimbals in mutually perpendicular planes comprising: a first cam member having a series of unidirectional stop members thereon and slidably secured to the frame; roller means movably secured to the outer gimbal adapted to be engaged by sliding movement of said first cam member; and a second cam member having a second series of unidirectional stop members thereon and rigidly secured to the inner gimbal adapted to be engaged by said roller means.

5. In a gyroscope including a rotor, an inner gimbal rotatably mounting the rotor, an outer gimbal mounting the inner gimbal for rotation about an axis perpendicular to the rotor axis, and a frame mounting the outer gimbal for rotation about an axis perpendicular to the axis of rotation of the outer gimbal, a caging mechanism for orienting said gimbals in mutually perpendicular planes comprising: a ring cam member slidably secured to the frame having a varying width dimension in the direction of the axis of rotation of the outer gimbal and having a series of unidirectional stop means thereon; a first roller secured to the outer gimbal offset from said outer gimbal axis and adapted to be engaged by sliding movement of the ring cam; and elongated cam member secured to the mounting shaft of said inner gimbal and having a second series of unidirectional stop means thereon; and a second roller coupled to the first roller and adapted to bear against the elongated cam member, whereby slidably urging the ring cam against the first roller, cams the outer gimbal into a plane perpendicular to the frame, and urging of the second roller against the elongated cam member cams the inner gimbal into a plane perpendicular to the outer gimbal.

6. The subject matter of claim 5, in which the series of unidirectional stop means on the ring cam surface and the alongated cam surface include graded steps acting to prevent the engaging rollers from retrogressing and moving away from the low point of said cam surfaces.

7. In a gyroscope including a rotor, an inner gimbal rotatably mounting the rotor, an outer gimbal mounting the inner gimbal for rotation about an axis perpendicular to the rotor axis, and a frame mounting the outer gimbal for rotation about an axis perpendicular to the axis of rotation of the outer gimbal, the combination comprising: a first cam member having a series of unidirectional stop means thereon and movably secured to the frame; a second cam member having a second series of unidirectional stop means thereon and rigidly secured to the inner gimbal; a cam roller means movably secured to the outer gimbal; means for moving the first cam member into engagement with the roller means whereby the roller means will be urged against the second cam member, the inner and outer gimbals being cammed into mutually perpendicular planes with respect to each other and said frame; means for retracting the first cam member to free the gimbals; a continuously rotating unbalanced disc coaxial with the rotor and rotating at a relatively low speed; and means secured to said inner gimbal responsive to tilting of the rotor axis for stopping said disc in a selected position.

8. A gyroscope comprising inner and outer gimbals and frame for mounting a rotor element with three degrees of freedom; an unbalanced disc having its axis substantially coinciding at all times with the axis of the rotor; means for continuously rotating the disc in response to rotation of the rotor and at a relatively slow speed; means on the inner gimbal for stopping rotation of the disc in a selected position operative in response to a tilting of the rotor axis from a direction normal to the surface of the earth; a ring cam member slidably secured to the frame; roller means movably secured to the outer gimbal adapted to be engaged by sliding movement of the ring cam member; an elongated cam rigidly secured to the inner gimbal adapted to be engaged by said roller means on each of said cam member preventing movement of said roller away from the low points of said cam members.

9. An apparatus for supporting bearings in aligned relationship which comprises a pair of bearing-receiving elements each providing means to removably support a bearing in a fixed relationship with said element, each of said bearing-receiving elements having a mounting surface by which it may be supported, means for supporting said bearing-receiving elements at opposed relatively spaced positions, said supporting means providing supporting surfaces generally corresponding to said mounting surfaces and permitting said elements to be initially adjustably shifted relative to said supporting means into oriented positions where said bearing-supporting means are in alignment with each other, and means to retain said bearing-receiving elements in said oriented positions to permit pairs of bearings to be interchangeably mounted in aligned relationship supported by said bearing supporting means.

10. An apparatus as recited in claim 9 wherein the mounting surfaces of said bearing-receiving elements are mounted in contact with said supporting surfaces.

11. An apparatus as recited in claim 9 wherein said supporting surfaces define openings in said supporting means and said bearing-receiving elements are positioned in said openings.

12. An apparatus as recited in claim 11 wherein said supporting surfaces and said mounting surfaces are so formed that said bearing-receiving elements may be inserted in but are restrained against passing through said openings.

13. An apparatus as recited in claim 9 wherein said retaining means permanently and immovably retain said bearing-receiving elements in said oriented positions.

14. An apparatus as recited in claim 13 wherein said retaining means comprise cementing means.

15. An apparatus as recited in claim 9 wherein said mounting and supporting surfaces are cooperating convex and concave surfaces and each of said surfaces is a surface of revolution generated by a curved generatrix.

16. An apparatus as recited in claim 9 further comprising a pair of frictionless bearings supported by said bearing-receiving elements in said fixed relationship with respect thereto.

References Cited in the file of this patent

UNITED STATES PATENTS

| | | |
|---|---|---|
| 1,342,397 | Sperry | June 1, 1920 |
| 1,912,246 | Barrett | May 30, 1933 |
| 1,993,236 | Barney | Mar. 5, 1935 |
| 2,044,536 | Maier | June 16, 1936 |
| 2,250,626 | De La Mater | July 29, 1941 |
| 2,326,784 | Lane | Aug. 17, 1943 |
| 2,352,469 | Carlson | June 27, 1944 |
| 2,531,334 | Grenat | Nov. 21, 1950 |
| 2,570,702 | Morse | Oct. 9, 1951 |
| 2,641,133 | Barkalow et al. | June 9, 1953 |
| 2,649,808 | Slater et al. | Aug. 25, 1953 |

FOREIGN PATENTS

| | | |
|---|---|---|
| 982,948 | France | June 18, 1951 |
| 645,896 | Great Britain | Nov. 8, 1950 |
| 371,412 | Italy | Mar. 23, 1939 |

UNITED STATES PATENT OFFICE
CERTIFICATE OF CORRECTION

Patent No. 2,919,586                         January 5, 1960

John S. Adkins

It is hereby certified that error appears in the printed specification of the above numbered patent requiring correction and that the said Letters Patent should read as corrected below.

Column 9, line 36, for "and elongated" read -- an elongated column 10, line 10, after "means" insert -- ; and means --.

Signed and sealed this 28th day of June 1960.

(SEAL)
Attest:

KARL H. AXLINE                      ROBERT C. WATSON
Attesting Officer                Commissioner of Patents